(12) United States Patent
Schley et al.

(10) Patent No.: US 7,394,244 B2
(45) Date of Patent: Jul. 1, 2008

(54) THROUGH-WALL POSITION SENSOR

(75) Inventors: William R. Schley, Rancho Santa Margarita, CA (US); Eric B. Chapman, Brea, CA (US); Dan Thanh Nguyen, Irvine, CA (US); Lawrence P. Flesch, Westminster, CA (US); Sandra Lynn Harper, Dana Point, CA (US); Curtis Edgar Stevens, Irvine, CA (US)

(73) Assignee: Parker-Hannifan Corporation, Cleveland, OH (US)

( * ) Notice: Subject to any disclaimer, the term of this patent is extended or adjusted under 35 U.S.C. 154(b) by 255 days.

(21) Appl. No.: 10/971,569

(22) Filed: Oct. 22, 2004

(65) Prior Publication Data

US 2005/0189938 A1    Sep. 1, 2005

Related U.S. Application Data

(60) Provisional application No. 60/513,487, filed on Oct. 22, 2003.

(51) Int. Cl.
*G01B 7/14* (2006.01)
*G01R 33/069* (2006.01)
*H01L 43/06* (2006.01)

(52) U.S. Cl. .................. 324/207.24; 324/207.2

(58) Field of Classification Search .............. 324/207.2, 324/207.21–207.25, 207.12, 207.15
See application file for complete search history.

(56) References Cited

U.S. PATENT DOCUMENTS

| 4,728,950 | A | 3/1988 | Hendrickson et al. |
| 4,920,797 | A | 5/1990 | Swartz et al. |
| 4,977,528 | A | 12/1990 | Norris |

(Continued)

OTHER PUBLICATIONS

Print-out of website: http://irtfweb.ifa.hawaii.edu/Faculty/xgfit/xgfit.doc—Published on the web Jul. 3, 2003 and Sep. 5, 2003.*

(Continued)

*Primary Examiner*—Reena Aurora
*Assistant Examiner*—Kenneth J Whittington
(74) *Attorney, Agent, or Firm*—Renner, Otto, Boisselle & Sklar, LLP

(57) ABSTRACT

A system and method for measuring the position of at least one field producing element (e.g., a magnet) without a direct electrical or physical connection between the field producing element and one or more sensors. In one embodiment, the output from an array of sensors (e.g., Hall Effect sensors) is curve fit using an algorithm having a characteristic bell curve (e.g., curve fit tracking algorithm, center of gravity algorithm, etc.) to determine at least one of an absolute or relative position associated with the field producing element and/or a property associated with the field producing element (e.g., magnetic flux). Another embodiment is directed to detecting errors in one or more of the sensors and excluding the output of the faulty sensors in determining the position associated with the field producing element.

21 Claims, 13 Drawing Sheets

U.S. PATENT DOCUMENTS

| | | |
|---|---|---|
| 5,056,049 A | 10/1991 | O'Neill |
| 5,541,405 A | 7/1996 | Hassler, Jr. et al. |
| 5,544,518 A | 8/1996 | Hart et al. |
| 5,589,769 A | 12/1996 | Krahn |
| 5,617,023 A | 4/1997 | Skalski |
| 5,636,548 A * | 6/1997 | Dunn et al. .................. 73/313 |
| 5,665,895 A | 9/1997 | Hart et al. |
| 5,744,701 A | 4/1998 | Peterson et al. |
| 5,793,200 A * | 8/1998 | Berrill .................... 324/207.2 |
| 5,918,199 A | 6/1999 | Yang et al. |
| 6,097,183 A | 8/2000 | Goetz et al. |
| 6,469,501 B1 | 10/2002 | Blanke et al. |
| 6,509,732 B1 * | 1/2003 | Rhodes et al. ......... 324/207.12 |
| 6,563,306 B2 * | 5/2003 | Sato ....................... 324/207.2 |
| 6,580,269 B2 | 6/2003 | Hiligsmann et al. |
| 6,586,927 B2 | 7/2003 | Pfeil et al. |
| 6,670,805 B1 | 12/2003 | Bahr et al. |
| 6,690,159 B2 * | 2/2004 | Burreson et al. ....... 324/207.23 |
| 2004/0150393 A1 * | 8/2004 | Lequesne et al. ....... 324/207.21 |

OTHER PUBLICATIONS

Philip R. Bevington et al., Data Reduction and Error Analysis for the Physical Sciences, WCB McGraw-Hill, 1992, Second Edition, chapter 8.*

* cited by examiner

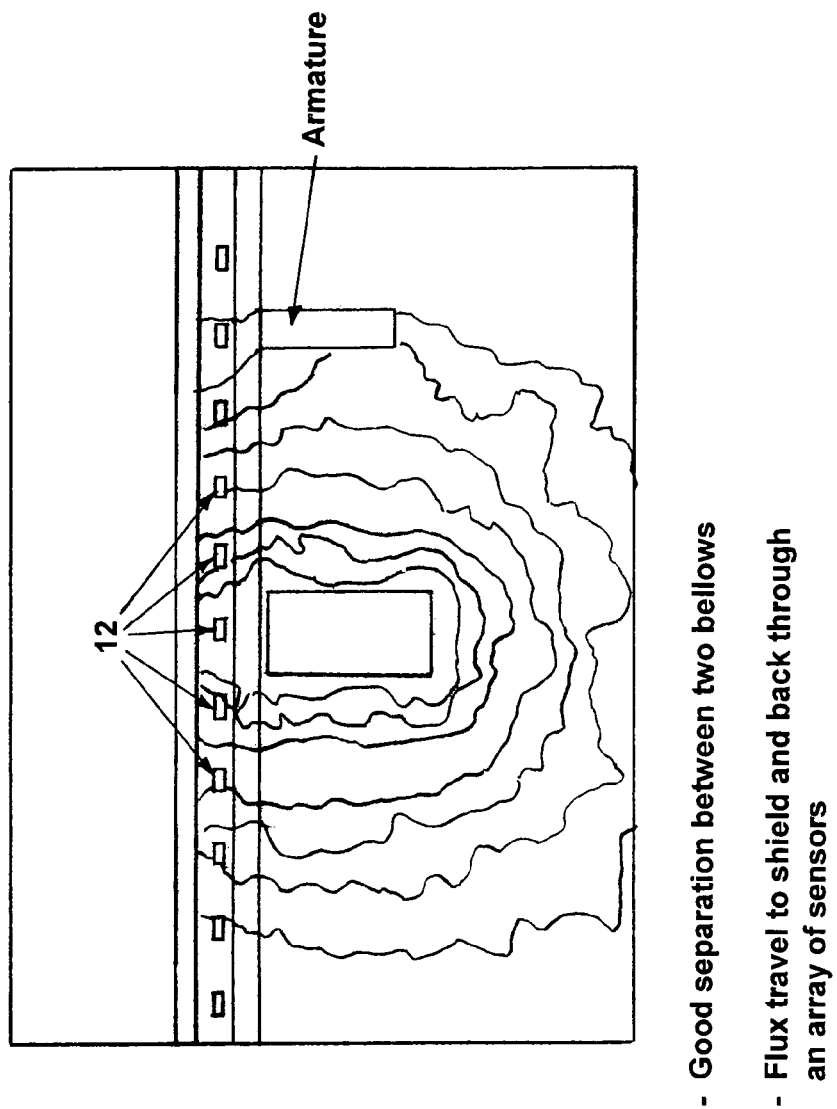
- Good separation between two bellows
- Flux travel to shield and back through an array of sensors
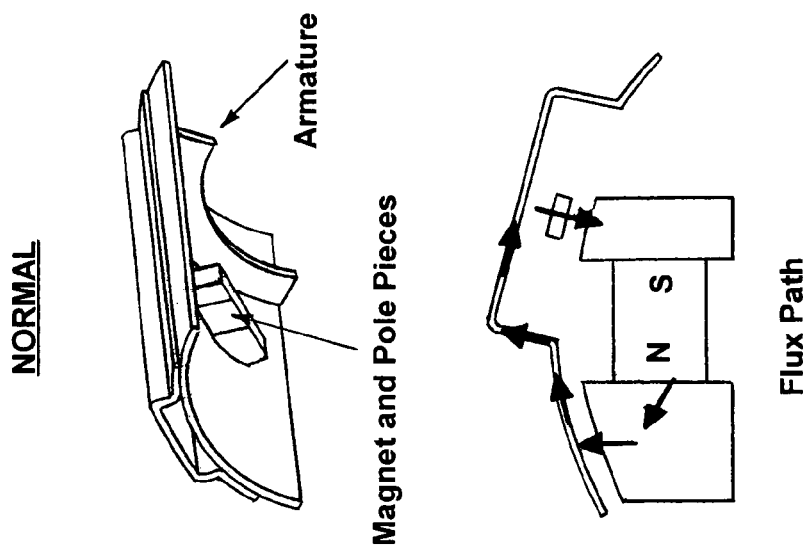
FIG. 9

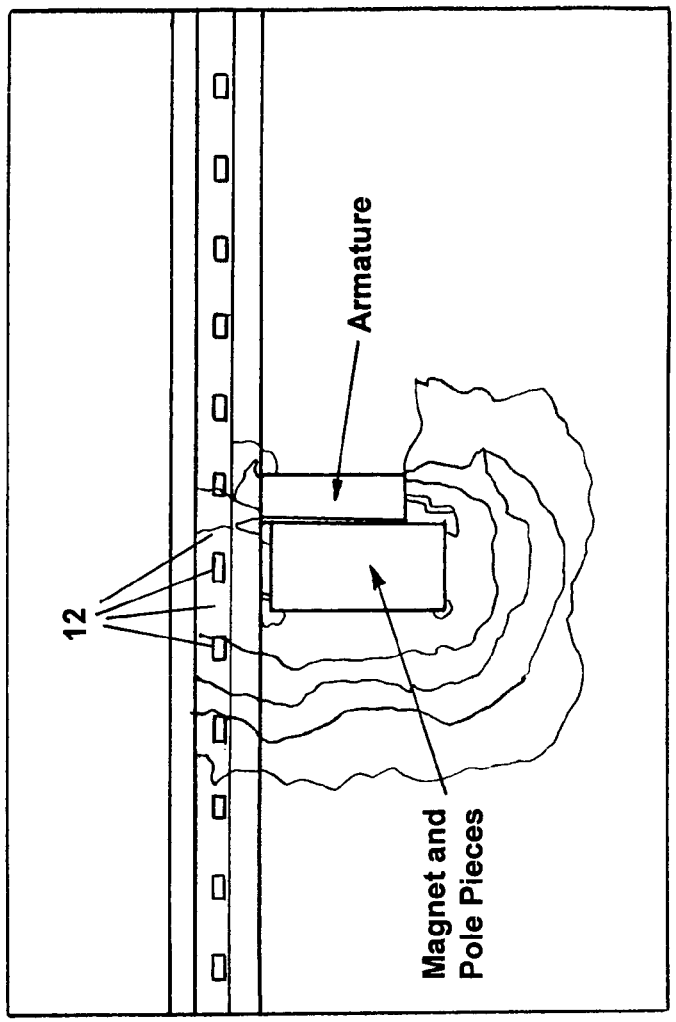
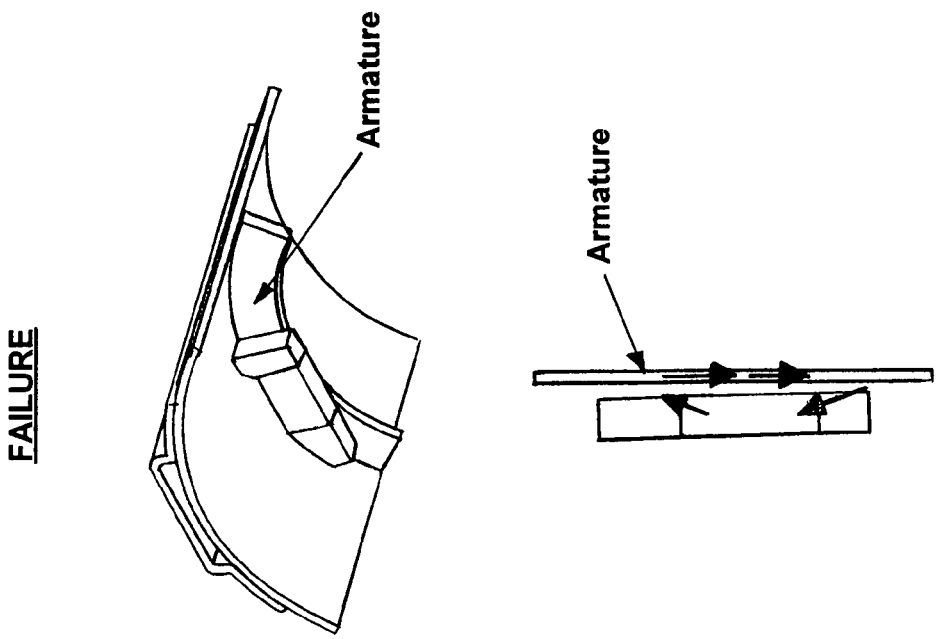
FIG. 10

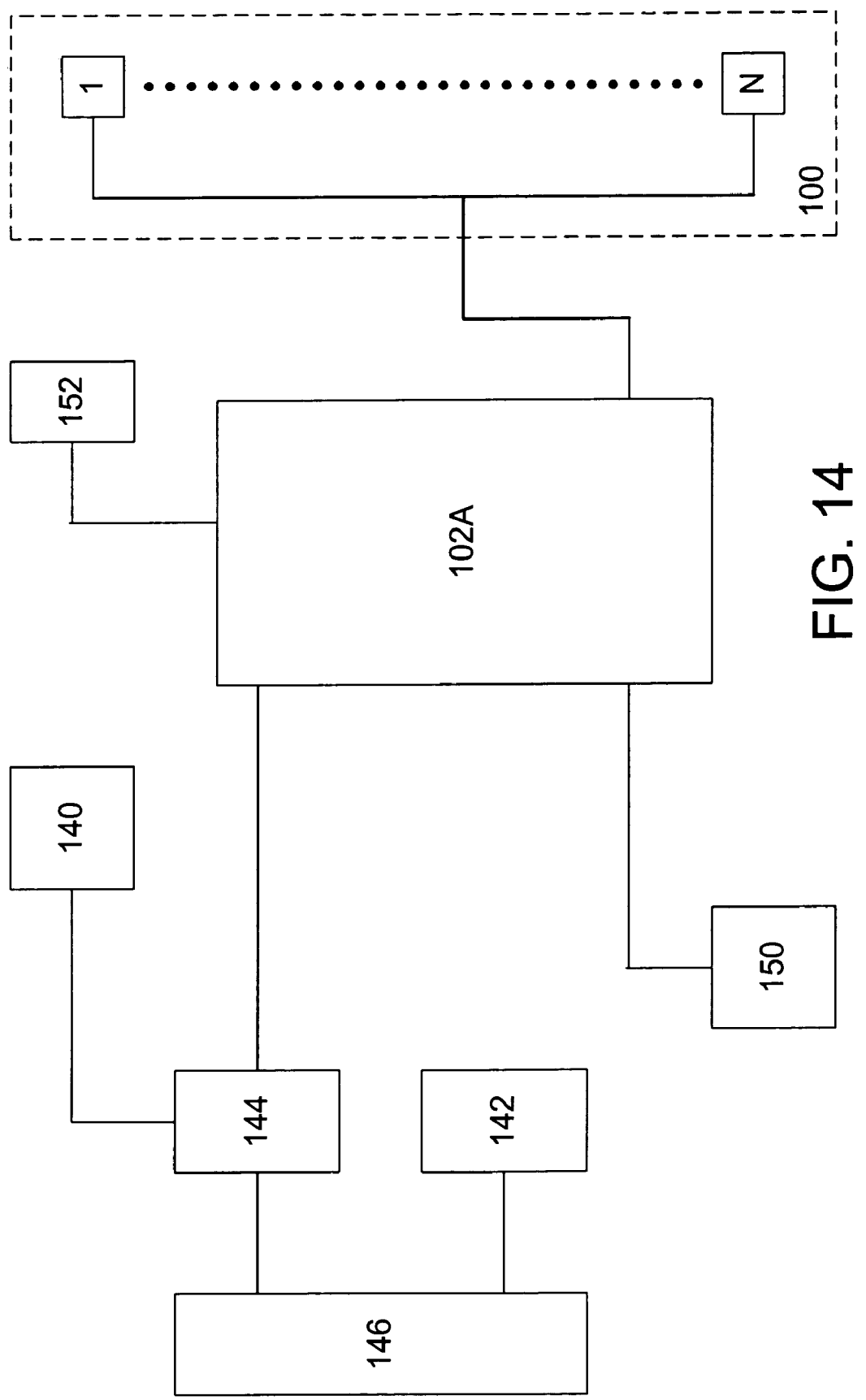

THROUGH-WALL POSITION SENSOR

RELATED APPLICATION DATA

This application claims the benefit of U.S. Provisional Application No. 60/513,487, filed Oct. 22, 2003 and entitled "Low Cost Fluid Level Sensor", which is incorporated by reference.

BACKGROUND OF THE INVENTION

The present invention relates generally to a system and method for detecting the position of one or more field producing elements and, more particularly, to a system and method that can determine the position of a moving field producing element without a direct electrical or physical connection.

A common requirement for controlling and monitoring electro-mechanical systems is to determine and/or measure the position of one or more moving elements. Determining and/or measuring the position associated with moving elements is generally straightforward when a direct electrical or mechanical connection is incorporated between the moving element(s) and the sensor(s) that detects the movement of the moving element(s). Such measurements become more difficult when there is no direct electrical or mechanical connection between the moving element(s) and the sensor(s) (e.g., contactless sensing).

The need for contactless sensing arises in a variety of applications. For example, fluid level sensors, sensing objects within a sealed container, clutch applications, linear variable differential transducer (LVDT) applications, etc. A drawback associated with conventional contactless position sensors relates to processing of the output signals from the sensors. Generally the outputs of such sensors are not completely linear and/or the property measured is non-linear. Another drawback with conventional contactless position sensors is the difficulty in excluding a measurement sensed from a sensor that has failed or is defective. Another drawback is the cost associated with implementing and managing multiple contactless position sensors.

Thus a need exists for a reliable and/or inexpensive contactless position sensor that overcomes the deficiencies set forth above.

SUMMARY OF THE INVENTION

The present invention relates to a system and method for measuring the position of at least one field producing element without a direct electrical or physical connection between the field producing element and the sensor or array of sensors. A processor (or logic device) processes the sensor array outputs using an algorithm that fits the sensor output to a characteristic bell-shaped curve in order to determine at least one of an absolute or relative position associated with the field producing element. In one embodiment of the invention a wall can be positioned (or otherwise located) between the field producing element and the sensor.

Another aspect of the present invention is directed to a position sensing system including a magnetic field producing element; a plurality of sensors for detecting at least one property associated with the magnetic field producing element, wherein the sensors provide an output indicative of the property detected by the sensors, a processor communicatively coupled to receive the output from the plurality of sensors, wherein the output is fit to a bell-shaped characteristic curve.

Another aspect of the present invention is directed to a position sensing system including a field producing means for producing a magnetic field; a sensing means for sensing at least one property associated with the field producing means; a processing means operable for processing the at least one property associated with the field producing means; and a fitting means for fitting the property sensed to a bell-shaped characteristic curve.

Another aspect of the present invention is directed to a position sensing system including a magnetic field producing element; a shorting armature positioned a distance from the magnetic field producing element, a plurality of sensors for detecting at least one property associated with an interaction between the magnetic field producing element and the shorting armature; and a processor communicatively coupled to the plurality of sensors, wherein the processor is operable to determine a position of at least one of the magnetic field producing element and the shorting armature.

Another aspect of the present invention relates to a through wall position sensor system including at least one field producing element separated by a wall from an array of sensors, wherein the array of sensors detects a property associated with the at least one field producing element; and a processor communicatively coupled to the array of sensors for processing at least one output signal associated with the array of sensors, wherein the processor utilizes a tracking curve fit algorithm to analyze the property of the at least field producing element to determine a position associated with the field producing element.

Another aspect of the present invention relates to a method for determining a position of a member including providing a field producing element; detecting at least one property associated with the field producing element, wherein the plurality of sensors include at least one output; processing information related to the at least one detected property of the field producing element; and analyzing the information using a bell-shaped characteristic curve to determine a position associated with the magnetic field producing element.

Another aspect of the present invention relates to a method for determining a position of a member including providing a field producing element; detecting a property of the field producing system by a plurality of sensors; processing information related to the detected property of the field producing system; analyzing the information using a bell-shaped characteristic curve; and determining a defect in at least one of the plurality of sensors.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

FIGS. 9 and 10 illustrate detecting a failure in accordance with aspects of the present invention.

FIGS. 11-14 illustrate various exemplary circuit designs in accordance with aspects of the present invention.

DETAILED DESCRIPTION

Figure 1A:
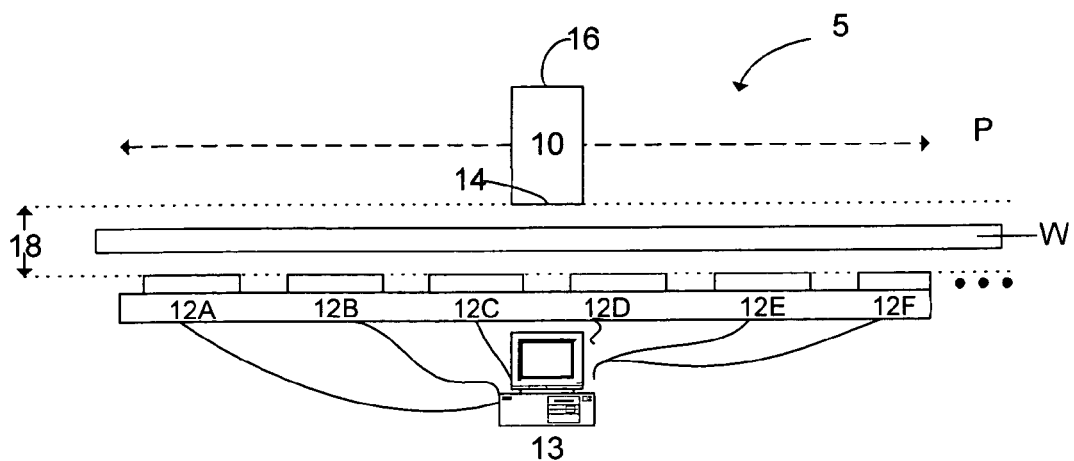
FIGS. 1A-1D are schematic representations of exemplary configurations of field producing elements and an array of sensors in accordance with the present invention.

In the detailed description that follows, corresponding components have been given the same reference numerals, regardless of whether they are shown in different embodiments of the present invention. To illustrate the present invention in a clear and concise manner, the drawings may not necessarily be to scale.

The present invention relates to a system and method for measuring the position of at least one field producing element without a direct electrical or physical connection between the field producing element and the sensor or sensors. The present invention generally makes use of an array of sensors to sense at least one property associated with the field producing element. A wall (e.g. a reservoir wall) can be positioned (or otherwise located) between the field producing element and the array of sensors. The sensed data is processed and fitted to a characteristic bell-shaped curve using an algorithm (e.g., curve fit tracking algorithm, center of gravity algorithm) to determine at least one of an absolute or relative position associated with the field producing element.

FIG. 1A illustrates an exemplary system 5. The system 5 includes a field producing element 10 and an array of sensors 12 (12A-12F). The output of the array of sensors can be transmitted to a processor 13 for additional processing. The field producing element 10 can include poles 14 and 16. The poles 14 and 16 of the field producing element 10 can be oriented substantially perpendicular (or normal) to the array of sensors 12 or in any predetermined orientation to the array of sensors 12. The array of sensors 12 can be oriented lengthwise along a path that is spaced apart and substantially parallel to the path P that is traversed by the field producing element 10 during operation. The path P may be a predetermined path or may be defined in real time as the field producing element 12 moves (or traverses) during operation. The array of sensors 12 may be evenly spaced, spaced in a non-uniform configuration, or a combination of evenly spaced and non-uniformly spaced sensors.

The field producing element 10 is spaced apart from the array of sensors 12. As shown in FIG. 1A, the field producing element 10 is spaced apart a distance 18 from the array of sensors 12. One of ordinary skill in the art will readily appreciate that the distance 18 may vary depending upon a number of criteria (e.g., the type of field producing element used, the strength of the field producing element, the type of sensor array used, the sensitivity of the sensor used, the application, the application environment, etc.).

While the distance 18 between the field producing element 10 is illustrated in FIG. 1A with a wall W positioned (or otherwise located) between the field producing element 10 and the array of sensors 12, the present invention may also be implemented without a wall W.

Figure 1B:
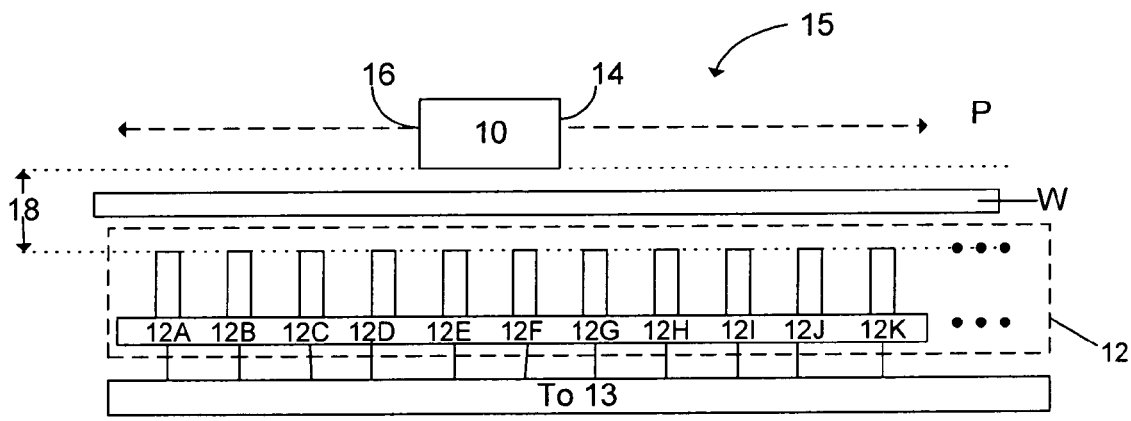

FIG. 1B illustrates another system 15. The system 15 includes a field producing element 10 that is generally oriented with its poles 14, 16 arranged lengthwise in a substantially parallel relationship with the array of sensors 12. The array of sensors 12 is spaced apart a distance 18 from the array of sensors. The array of sensors 12 is generally oriented with its longitudinal axis of each sensor (12A-12K) perpendicular to the poles 14, 16 of the field producing element 10. The array of sensors 12 are generally positioned discretely along at least a portion of the path P that the field producing element 10 may traverse during operation. The array of sensors 12 is generally aligned in a substantially parallel relationship to the path P. The output of the array of sensors 12 can be transmitted to a processor 13 for additional processing.

While the distance 18 between the field producing element 10 is illustrated in FIG. 1B with a wall W positioned (or otherwise located) between the field producing element 10 and the array of sensors 12, the present invention may also be implemented without a wall W.

Figure 1C:
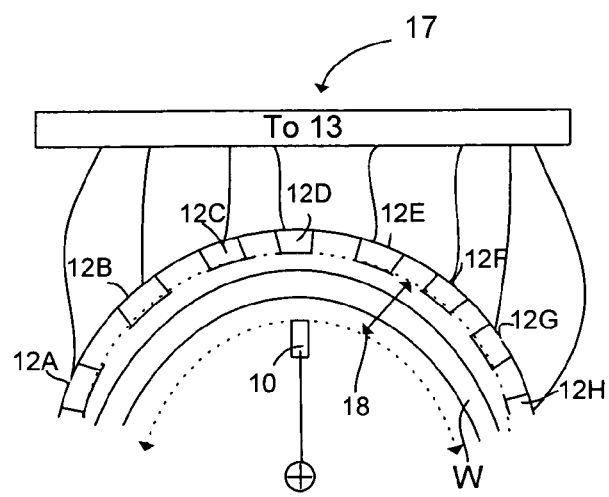

FIG. 1C illustrates another system 17. The system 17 includes an array of sensors 12 that are positioned for detecting a field producing element 10 moving in a curved path. The array of sensors 12 can be positioned lengthwise in a radial direction along a path P that is spaced apart a distance 18 from the path of the field producing element 10. In such a configuration, the poles 14, 16 for the field producing element 10 can be a substantially perpendicular (or normal) to the array of sensors 12. The output of the array of sensors 12 can be transmitted to a processor 13 for additional processing.

While the distance 18 between the field producing element 10 is illustrated in FIG. 1C with a wall W positioned (or otherwise located) between the field producing element 10 and the array of sensors 12, the present invention may also be implemented without a wall W.

Figure 1D:
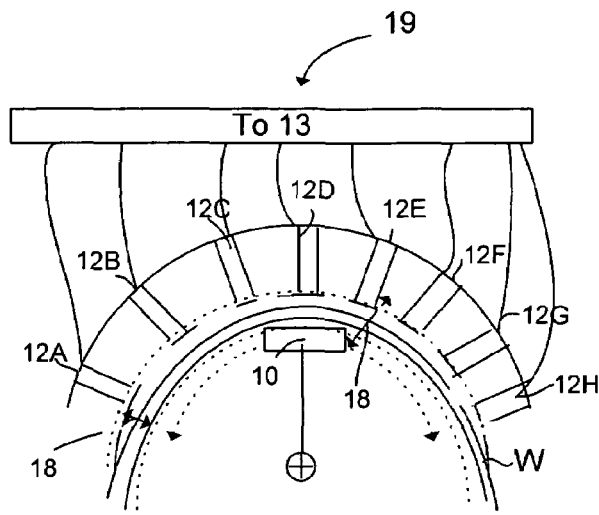

FIG. 1D illustrates another system 19. The system 19 includes an array of sensors 12 that are positioned for detecting a field producing element 10 moving in a curved path. The array of sensors 12 can be positioned (or otherwise located) widthwise in a radial direction along the predetermined path of the field producing element 10. In such a configuration, the poles 14, 16 for the field producing element 10 can be oriented substantially normal to at least one sensor (from the array of sensors 12) (e.g., when the field producing element 10 is positioned directly above a particular sensor).

While the distance 18 between the field producing element 10 is illustrated in FIG. 1D with a wall W positioned (or otherwise located) between the field producing element 10 and the array of sensors 12, the present invention may also be implemented without a wall W.

In one embodiment of the present invention, the field producing element 10 is a magnet or magnetic field producing body (e.g., a bar magnet, a ring magnet, a permanent magnet, electromagnet, magnet in conjunction with permeable pole pieces, etc. One of ordinary skill in the art will readily appreciate that the present invention is generally applicable to a wide variety of technologies including those produce or emit light, ultraviolet radiation, infrared radiation, radioactive isotopes, radio frequency, etc.).

Figure 2:
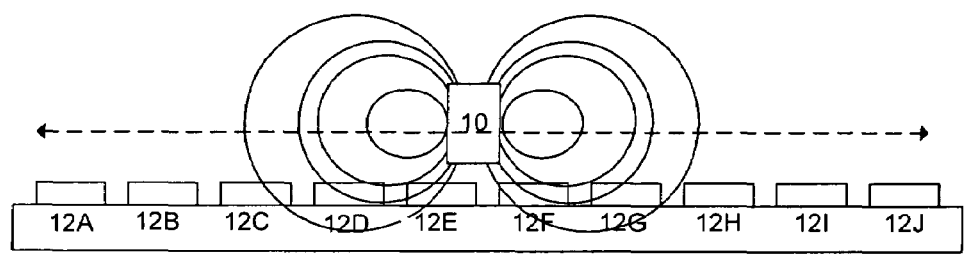
FIG. 2 illustrates exemplary magnetic flux patterns and sensor orientations in accordance with aspects of the present invention.

The array of sensors 12 can be any type of sensor or sensors that can measure at least one property associated with the field producing element 10. The array of sensors 12 can be uniformly spaced or non-uniformly spaced or any combination thereof. Preferably, the array of sensors 12 is an array of Hall Effect sensors. In one embodiment, the array of sensors 12 is an array of Allegro A3515 linear Hall Effect sensors. In general terms, a Hall Effect sensor produces a bipolar signal proportional to the intensity of the normal magnetic flux density. An exemplary magnetic flux pattern is illustrated in FIG. 2, in accordance with one embodiment of the present invention. One of ordinary skill in the art will readily appreciate that a variety of sensors may be used in accordance with the present invention (e.g., non-linear sensors, on-off Hall Effect sensors, linear sensors, analog sensors, digital sensors, etc.

Figure 3:
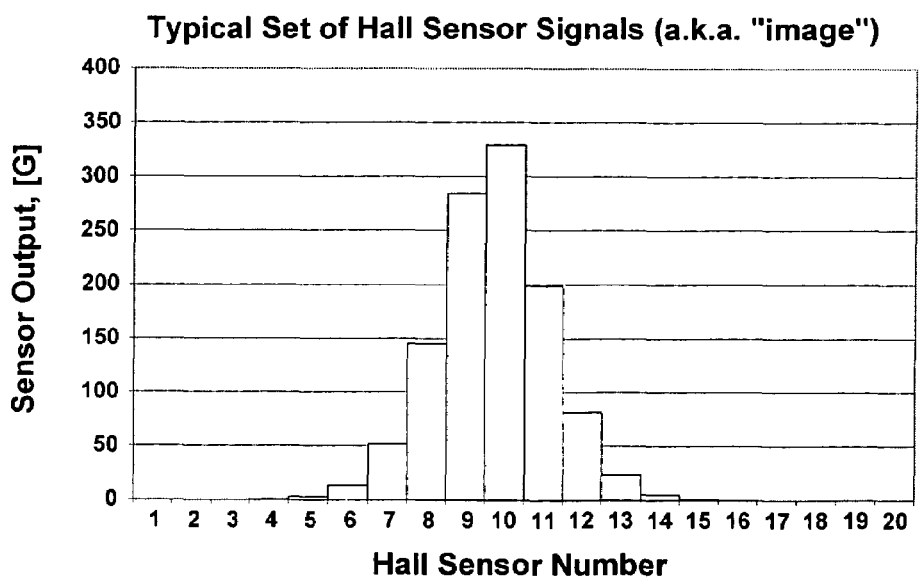
FIG. 3 illustrates an exemplary sensor image in accordance with aspects of the present invention.

FIG. 3 illustrates a typical "snapshot" or "image" of signals from an array of sensors 12 as the field producing element 10 traverses along the array of sensors 12. Depending on the mounting orientation, the array of sensors 12 can be used to form an image of an S-curve (not shown) or a bell-curve shape, as in FIG. 3. Referring to FIG. 3, the measured property (e.g. magnetic flux density) associated with the field producing element 10 is depicted on the y-axis and the x-axis depicts the position of the field producing element 10 in relation to the array of sensors 12 along the x-axis. For example, as shown in FIG. 3, the x-axis depicts an array of twenty sensors and the y-axis depicts individual sensor outputs in Gauss units. The set of all sensor outputs captured within one sampling interval is referred to herein as a "snapshot" or "image".

The snapshot or image of the signals, taken together as a set, provides a visual representation of the measured property (e.g., magnetic flux density) along the array of sensors 12. As discussed in detail below, the measured property (e.g., magnetic flux pattern) is characterized using a mathematical function. The mathematical model used in accordance with one aspect of the present invention is:

$$s(x) = ae^{-b|(x-c)/D|^d}, [G] \quad (1)$$

where x=sensor position, [inches]
a=flux at the peak of the bell-curve, [Gauss]
b=width factor, [dimensionless]
c=location of center of the bell-curve, [inches]
d=shape factor, [inches]
D=distance between sensors, [inches]

Figure 4:
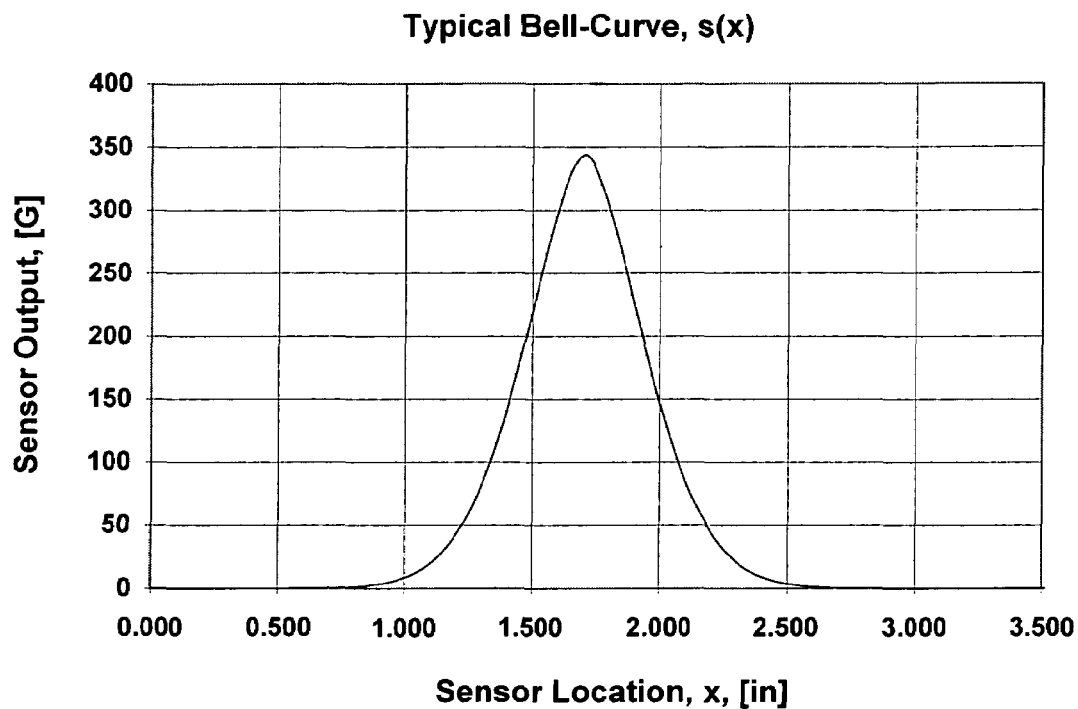
FIGS. 4, 5 and 6 illustrate various characteristics associated with the characteristic bell-shaped curve used in accordance with aspects of the present invention.
Figure 5:
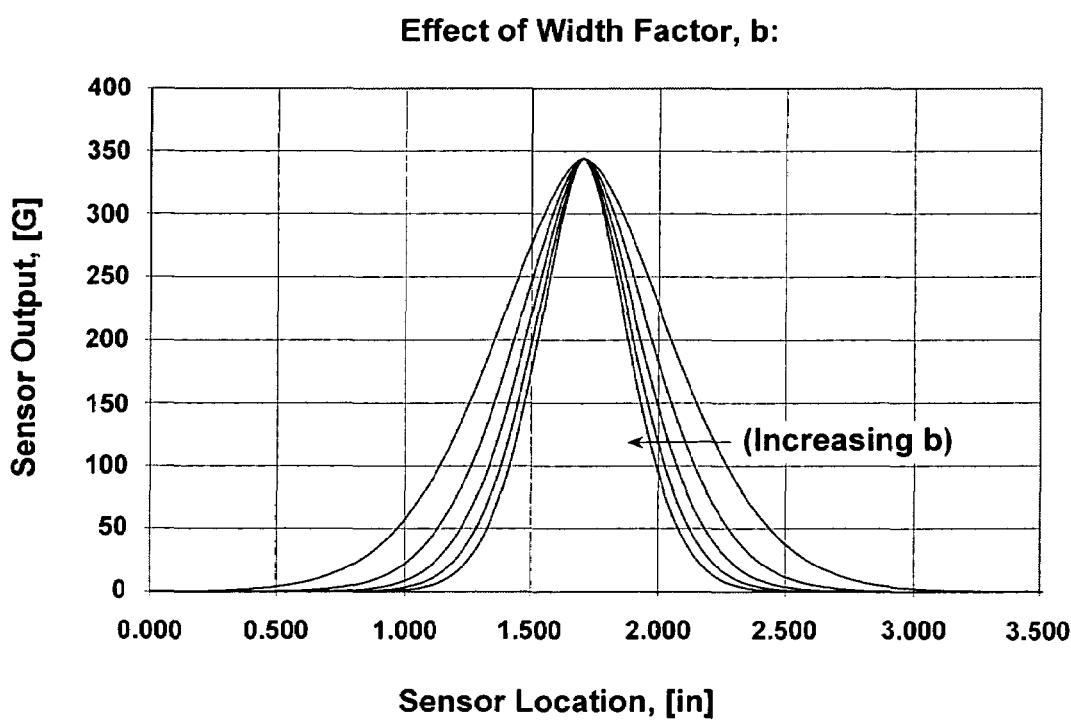
Figure 6:
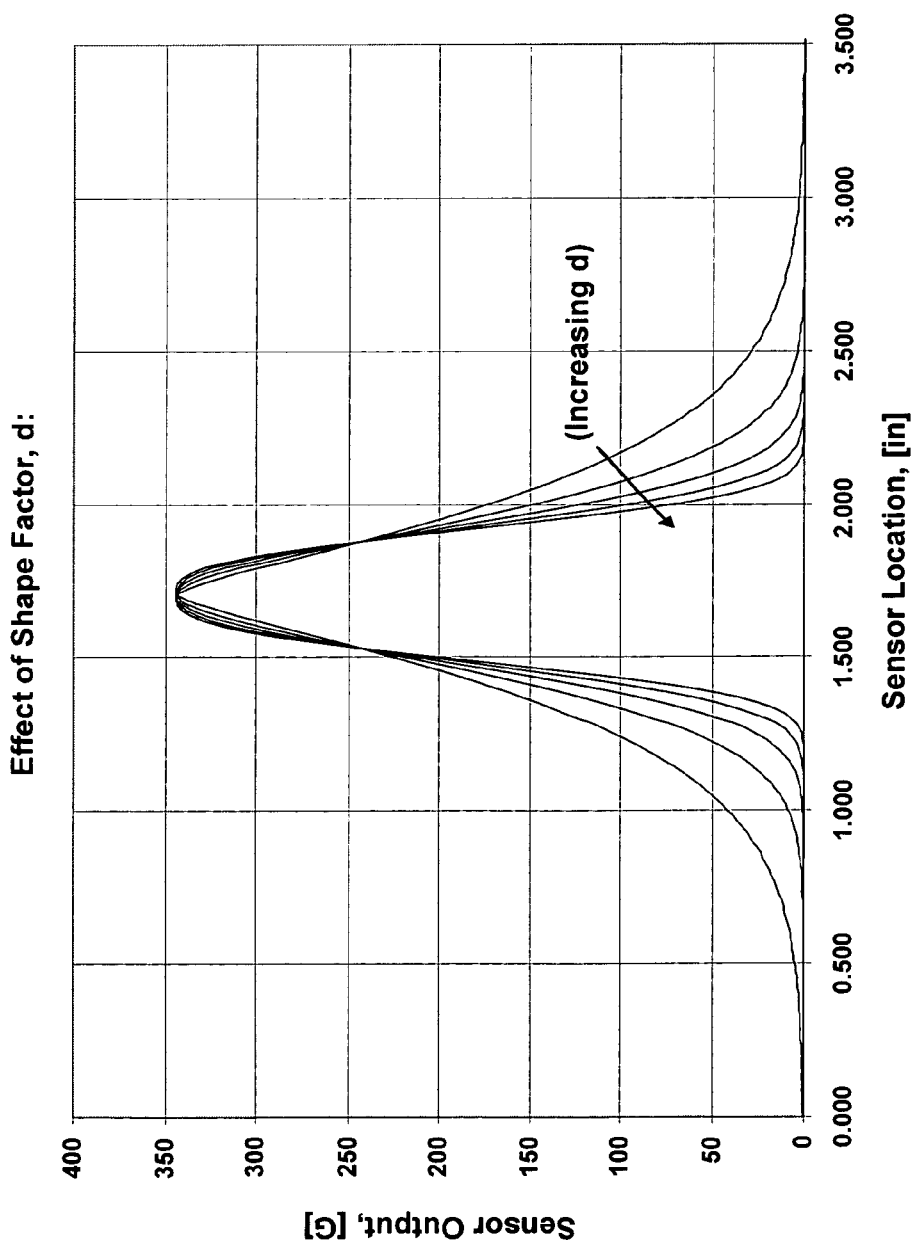

Typical values for the width factor, b may generally range from 0.20 to 0.35, and for the shape factor, d generally range from 1.3 to 1.7. A typical bell-curve is plotted in FIG. 4, using a=344 Gauss, b=0.35, c=1.704 inches, d=1.7 inches, and D=0.1757 inches. The effect of the width factor, b, is simply to scale the curve widthwise, as shown in FIG. 5. Shape factor d influences the roundness of the peak, as shown in FIG. 6. The height parameter, a, is the measured property (e.g., magnetic flux density) at the peak of the bell-curve.

The present invention is applicable to a wide variety of applications and particularly well suited for applications where non-intrusive position measurement devices are desired. Generally, two types of position measurements may be obtained and applied in accordance with aspects of the present invention. The first position measurement remotely measures the absolute position of a member (e.g. a piston inside a cylinder). The second position measurement generally measures both the absolute and relative position of two independent members (e.g. two pistons inside a sealed cylinder or reservoir). Two exemplary embodiments in accordance with the present invention involve a lift fan actuator system and a dual bellows reservoir system.

In the lift fan actuator system, the absolute position of a rotating 12" diameter piston can be measured. With respect to the dual bellows reservoir system, measurements related to the absolute and relative positions of a gas and a fluid bellows, respectively, inside an enclosed reservoir system. For both applications, the magnetic flux (also referred to herein as magnetic flux density) is generally incident to the face of the sensing element at angles substantially near 90 degrees. Generally, the array of sensors 12 measures, senses or otherwise indicates the levels of the incident magnetic field, which results in a detected electrical signal of each element that takes the shape of a characteristic bell curve with the peak representing the relative position of the magnet.

Figure 7:
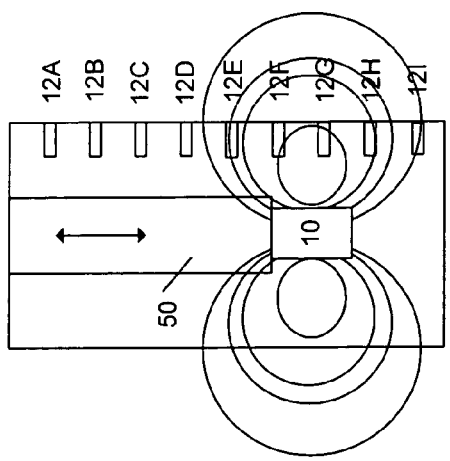
FIG. 7 illustrates exemplary magnetic flux patterns and sensor orientations in accordance with aspects of the present invention.

Referring to FIG. 7, an exemplary lift fan application is illustrated. The position of a piston 50 can be measured by mounting a field producing element 10 (e.g., a ring magnet) onto the piston 50 with an array of sensors 12 (e.g., linear Hall Effect sensors) mounted on the outer cylinder wall 52. As the field producing element 10 shifts position along the array of sensors 12, the sensors over the magnet sense the flux pattern, and the flux level decreases as the distance from the magnet increases. The resulting image is repetitively (or iteratively) fitted to a characteristic bell shaped curve as the piston changes position. This method of position measurement can be used on many cylinder applications with non-magnetic-cylinder material by mounting a field producing element on the piston 50 and attaching the array of sensors 12 to the outside of the cylinder 52.

One of ordinary skill in the art will readily appreciate that various sensors and field producing elements can be configured or otherwise combined in a variety of combinations and fall within the scope of the present invention. For example, the array of sensors 12 can be mounted flat on the outside of the piston cylinder wall with a radially polarized ring magnet or the sensors can be vertically mounted in relation to an axially polarized magnet. As previously stated, the array of sensors 12 are preferably Hall Effect sensors. Hall Effect sensors are generally relatively thin and, therefore, mounting them perpendicular to the circuit board allows closer sensor spacing than a flat mount arrangement, thereby enabling higher accuracies.

Figure 8A:
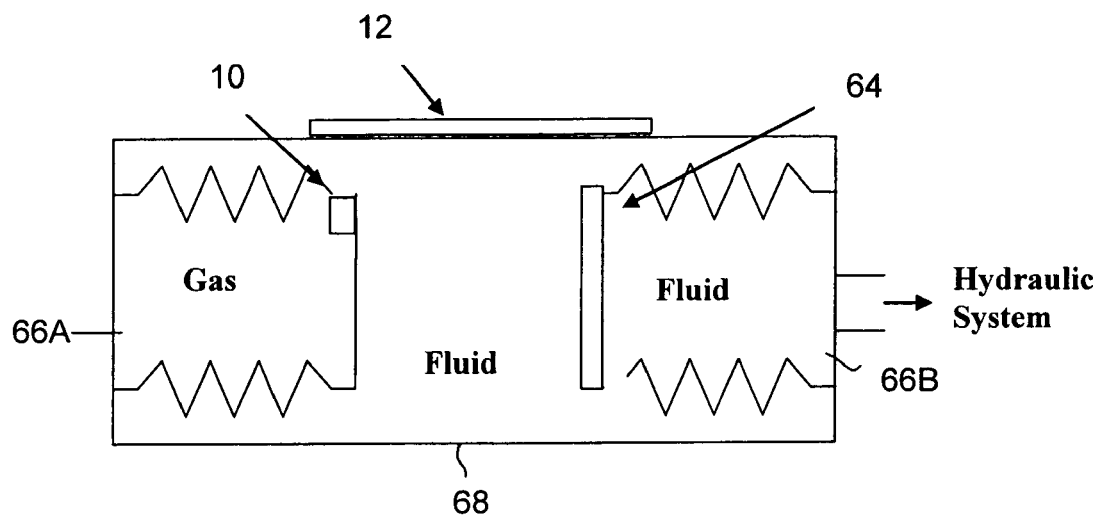
FIGS. 8A and 8B illustrate another exemplary application in accordance with aspects of the present invention.
Figure 8B:
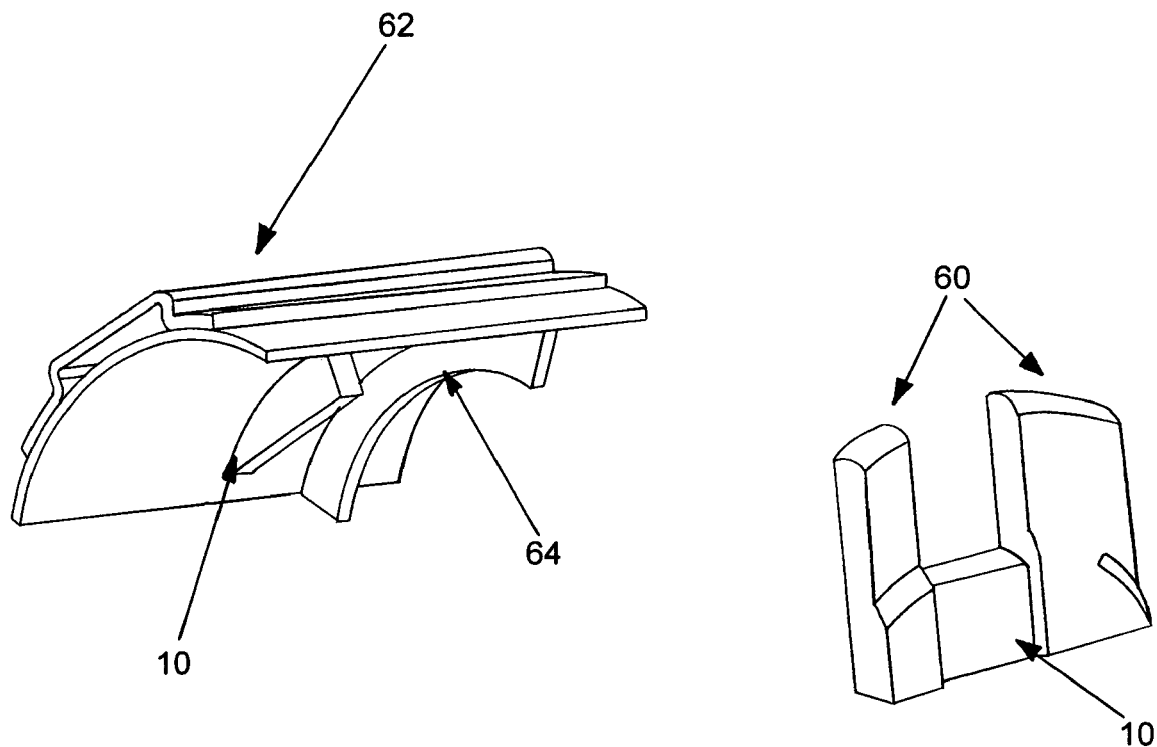

In the dual bellows exemplary application, a field producing element 10 (e.g., a permanent bar magnet), field shaping poles 60, a flux shield 62 and a shorting armature 64 are used to measure both relative and absolute position of two bellows 66A and 66B, respectively, within a reservoir 68. An exemplary embodiment of the dual bellows application is illustrated in FIGS. 8A and 8B.

A field producing element 10 (e.g., a bar magnet) secured to two magnetically permeable field shaping pole pieces 60 are mounted on one bellows end cap (e.g. 66A) and a shorting armature 64, also made of magnetically permeable material, is mounted on the other bellows end cap (e.g., 66B). During normal operating conditions, the fluid volume inside the fluid bellows 66A, 66B fluctuates causing both bellows 66A, 66B to move while maintaining a substantially fixed separation distance 70. At the fixed separation distance 70, the field shaping pole pieces 60 direct magnetic flux from the field producing element 10 to an array of sensors 12 (e.g., linear Hall Effect sensors) located on the outside (or exterior) of the reservoir 68. This configuration offers redundancy since if either one of the bellows 66A, 66B fails, delivery of hydraulic fluid to the system will not be compromised. However, when a failure occurs in either of the bellows 66A, 66B, the fluid between the two bellows will seep away causing the two bellows 66A, 66B to approach each other. As the shorting armature 64 approaches the field producing element 10, magnet flux is directed away from the field producing element 10 and is rerouted away from the array of sensors 12. Therefore, the magnetic flux intensity sensed by the array of sensors 12 decreases, which has the effect of scaling down the image vertically. This phenomenon can be correlated to the relative distance between the field producing element 10 and shorting armature 64, enabling two position measurements with one sensor array. The two phenomena are illustrated in FIGS. 9 (for an exemplary normal operating condition) and 10 (for an exemplary bellows failure condition).

The selection of magnetic materials associated with the field producing element 10 (e.g. permanent magnets) and the field shaping poles 60 are generally dependent upon the application. For example, a permanent magnet was selected in this exemplary embodiment to ensure that the field producing element produced magnetic flux associated with the working gap (or fixed separation distance 70) of the device. Depending upon the application, certain material types (grades) will be more appropriate than others. The selection of materials for the permanent magnets is primarily based upon the field strength required, space available for the magnet, temperature stability, susceptibility to de-magnetization and cost. Typical field producing elements include permanent magnets manufactured of Neodymium-Iron-Boron, Samarium Cobalt and Alnico.

The field shaping poles 60 may be manufactured from a variety of magnetically permeable materials including Low Carbon Steel, Electrical Iron, and other ferrous metals, etc. to allow the magnetic flux to be directed to the array of sensors 12 without significant losses. Also, low carbon steel has a very narrow hysteresis loop which tends to minimize the distortion of signal due to the effects of hysteresis.

Also illustrated in FIG. 8B is a flux shield 62 comprised of two layers 70, 72 of the outer shell. The outer most layer 70 is generally made of a non-magnetic material and is intended to protect the inner shell 72 from damage. The inner shell 72 is also called a flux cap and is used to shield the array of sensors 12 from external source of magnetic flux. The inner shell 72 can also direct magnetic flux to the array of sensors 12. It is preferable for the flux shield 62 to be suitably thin so that the magnetic flux produced within the reservoir 68 travels directly to the array of sensors 12. Generally, the thicker the material of the flux shield 62, the more magnetic flux is dissipated and thereby requiring a larger magnet for accurate measurements.

To prevent the need for alignment of the bellows 66A, 66B during installation, the shorting armature 64 can alternatively be a ring of magnetic material attached to a non-magnetic bellows end cap or the whole end cap can be made of magnetic material, as shown in FIGS. 8A and 8B. The bellows 66A and 66B are preferably made up of non-magnetic preferably 300 Series Stainless Steel to prevent unnecessary distortion of the magnetic field. In the case where magnetic bellows are used and depending on the permeability of the material, a standoff may be needed to separate the field producing element 10 and field shaping pole pieces 60 from the bellows 66A, 66B.

Figure 11:
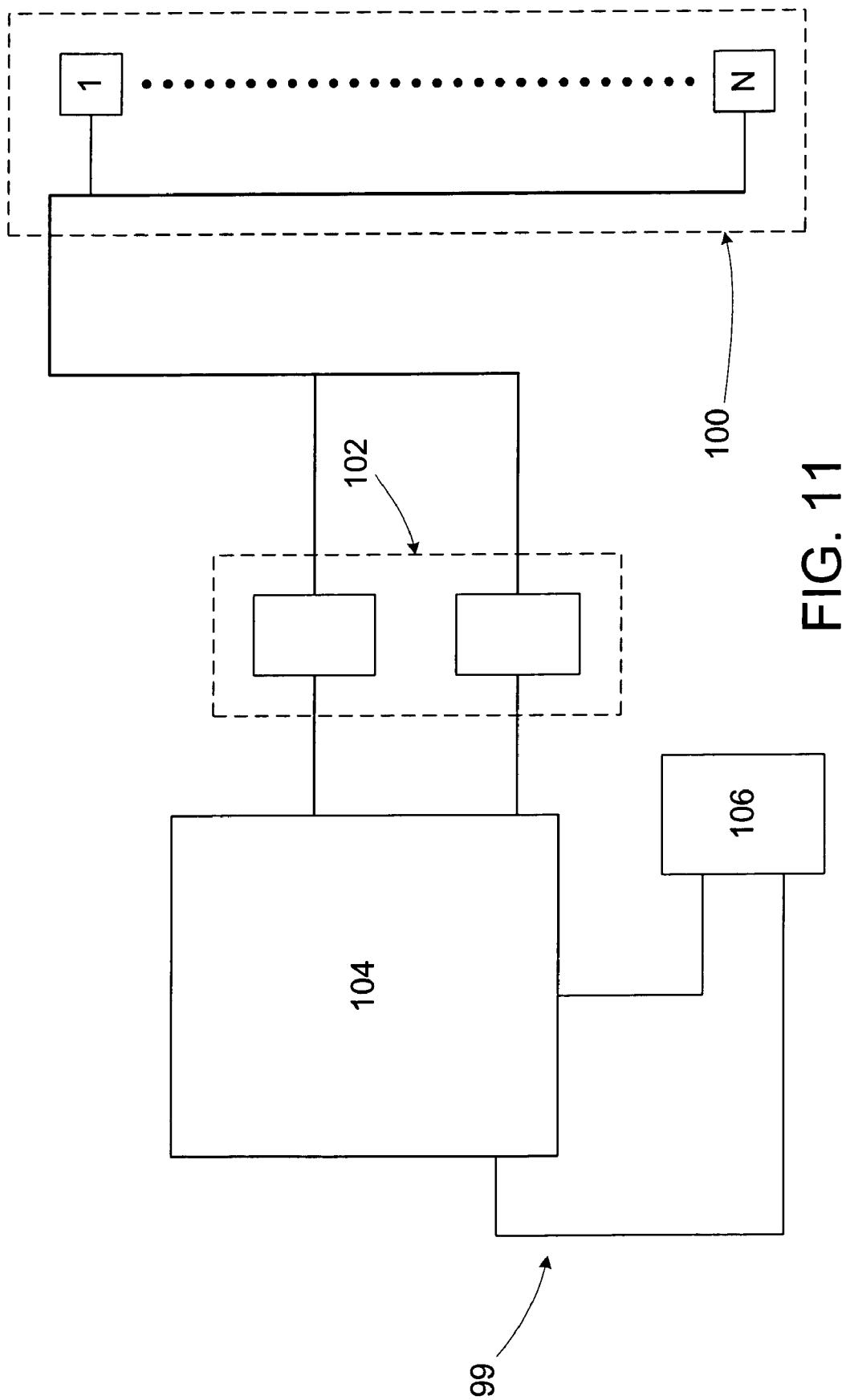

Referring to FIG. 11, an exemplary electronic circuit 99 acquires information from the array of sensors 12. The exemplary electronic circuit 99 generally consists of twenty linear Hall Effect sensors identified by block 100. The output for each of the twenty sensors ranges between 0 and 5 volts. When the sensors are not subjected to a magnetic field, the sensors generally output a voltage just slightly above 2.5 volts quiescent level. When subjected to a magnetic field, the output generally moves toward 5 volts or 0 volts depending on the polarity and magnitude of the magnetic field. In the dual bellows application, due to the geometry of the hardware design, the field producing element 10 (e.g., magnet) is attached to one of the two bellows and placed beneath the array of sensors 12, which causes an associated sensor output deflection in only the positive direction (i.e., quiescent to some voltage greater than quiescent but less than 5 volts).

The sensor outputs can be converted to a digital signal by an analog-to-digital converter. As shown in FIG. 11, two 11 channel serial 10-bit Analog-to-Digital converters 102 are utilized in one aspect of the present invention. The timing and signal generation for the analog-to-digital converters 102 are generally controlled by a field programmable gate array 104 (e.g. an Altera 10K10 FPGA). The FPGA 104 can synchronize analog-to-digital captures and conversions of the output signals, convert the serial sensor data to a format that is compatible with a standard communication protocol (e.g., RS-232C data transmission) in order to transmit the received data to a computer. The FPGA 104 generally transmits the RS-232 data frames to a Windows personal computer via a universal asynchronous-receiver-transmitter (UART) 106 and a RS-232 PHY chip. One of ordinary skill in the art will readily appreciate that the terms "computer" and "personal computer" as used herein should be interpreted broadly and include all electronic devices regardless of operating system (e.g., Windows, Macintosh, Linux, etc) that are communicatively linked to a processor for performing mathematical operations on the data measured by the sensors In addition to transmitting sensor data to a processor, the FPGA 104 can also capture and transmit data from a separate Quadrature type incremental position encoder. The encoder circuit is intended to provide precision second party position data synchronized to each sensor array image capture for performance assessment. The FPGA 104 also sends data representing internal and external voltage reference data from the analog-to-digital converters 102.

Figure 12:
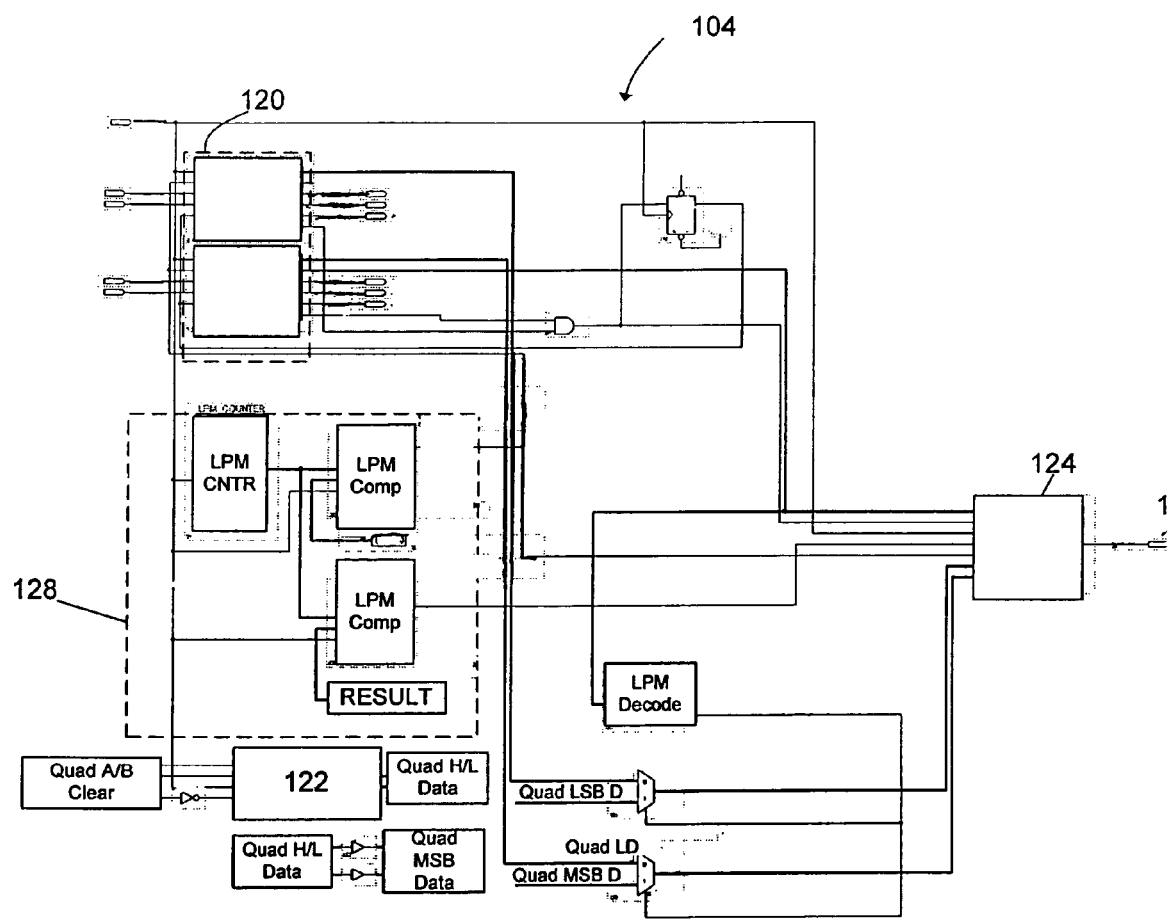

As shown in FIG. 12, the FPGA 104 is generally comprised of four basic sections that can be used to read or interpret the external analog-to-digital converters 102, track and count an incremental encoder's Quadrature signal and transmit the combined data out over an RS-232C transmitter channel. A general description of the four top layer modules of the FPGA 104 is provided as follows.

The first module is the "ADCMod" 120. The ADCMod 120 provides timing sequences to the serial (SPI) interface on the external analog-to-digital converters and performs a serial to parallel conversion on a channel-by-channel basis. The ADCMod 120 also provides an incremented address to the analog-to-digital converters with each cycle starting at zero until it reaches address 13. In addition, the ADCMod 120 outputs a latch signal after each conversion so that its data can be stored to RAM by a second module. As shown in FIG. 12, the ADCMod 120 includes two duplicate modules. The duplicate modules operate in tandem and support the two analog-to-digital converters, identified collectively as 102.

The "QuadIN" module 122 generally receives Quadrature A & B signals and converts the signals into a position count via an up/down counter. Data from the counter is inserted into the universal asynchronous receiver-transmitter (UART) output data frame by the sequencing modules.

The "FullmodeTx" module 124 generally contains a block of storage random access memory (RAM) for trapping the analog-to-digital conversions presented to it by the ADCMods 120. The FullmodeTx module 124 also contains circuitry to format and serialize at least a portion of the data into UART frames. In addition, the FullmodeTx module 124 also outputs data on the Sout output line 126 at 115.2K BAUD every 10 ms.

The "Timing and Sequencing Modules" 128 generally coordinate and synchronize operations with the other modules. In one embodiment, the counter based sequencer circuit wraps every 10 milliseconds.

It will be appreciated by those having ordinary skill in the art that the components, values and functions discussed above may be modified. For example, a microcontroller, a digital signal processor, programmable gate array, an ASIC, etc. may be used in place of or in conjunction with a FPGA, the data sampling rate may be faster or slower than 10 millisecond depending on the application, etc. The specific examples are in no way intended to limit the scope of the present invention.

A computer is generally capable of receiving and analyzing the sensor data (or information). Generally the computer transmits and receives data from the circuit board through a port following a specified communications protocol (e.g., RS-232). Subsequent processing of the sensors is generally accomplished with an executable application program (e.g. a Visual C++ program). Processing of the sensor data can include any desired calculation or logic operation. In one aspect of the invention, the sensor image data is processed and fit to a characteristic bell-shaped curve using a suitable algorithm (e.g., curve fit tracking algorithm, center of gravity algorithm, etc.) from which a position of the field producing element 10 and/or a signal attenuation due to a shorting armature 64 can be derived.

Figure 13:
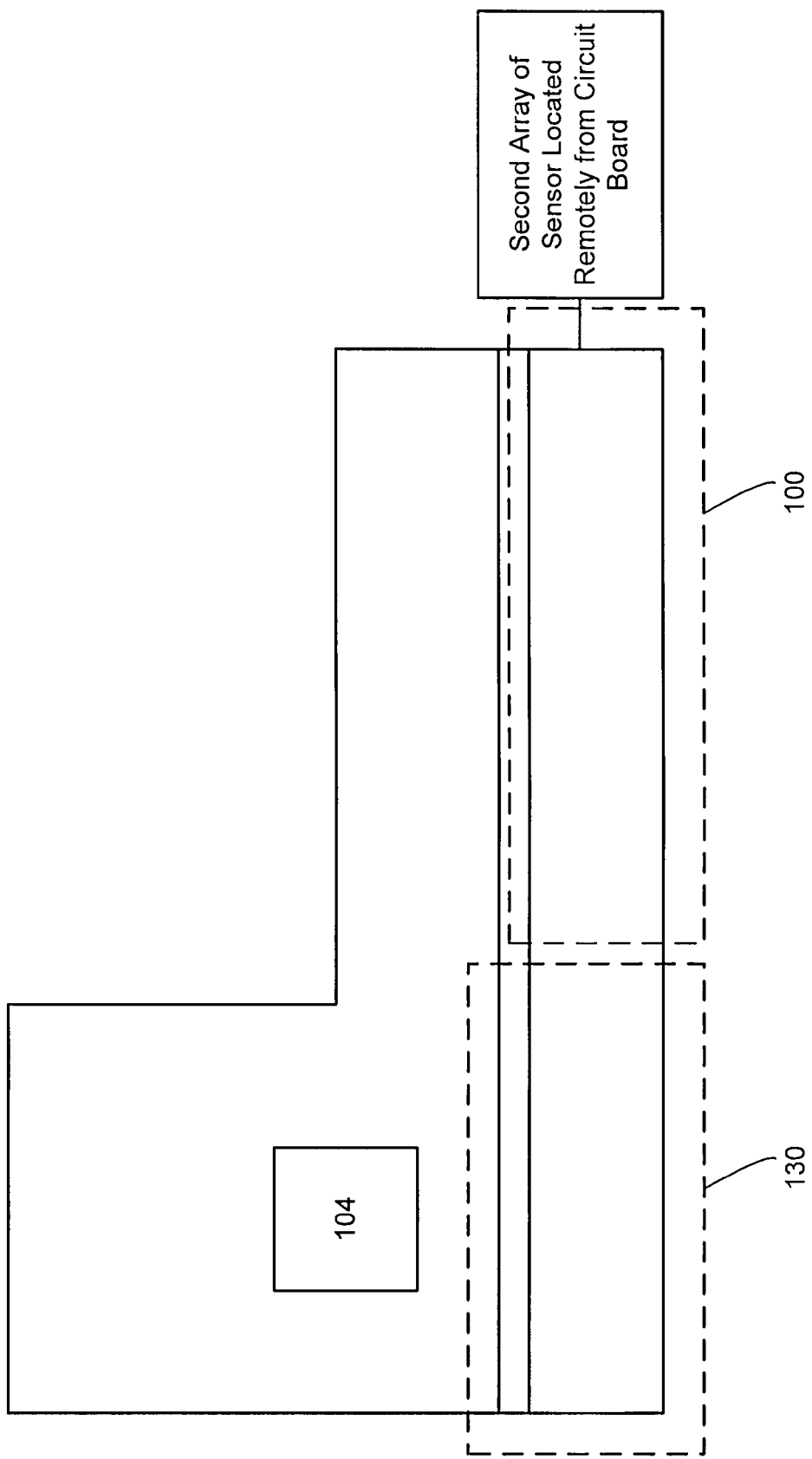

A drawing of an exemplary printed circuit board layout in accordance with one aspect of the present invention is illustrated in FIG. 13. For purposes of clarity only, the array of sensors 100, the FPGA 102, the header 132, and detachable strip of LED's 130 are identified. Along the bottom of the circuit board is a detachable strip of LED's 130, which can be attached to a 26-pin header 132 and used as a display to demonstrate a discrete twenty position method of position detection using on-off type sensors. The array of sensors 100 are generally secured to the circuit board. The circuit board can also be generally configurable to communicate with additional sensors (e.g., a second array of sensors) by daisy-chaining or otherwise interfacing the circuit board with the additional sensors, thereby extending the range in which the property generated or produced from a field producing element 10 may be detected.

An alternative electronic design may be used in accordance with the present invention. The alternative electronic design is particularly useful for a linear position sensor, and specifically on a piston position sensing system with non-ferrous hydraulic cylinders. A schematic view of the exemplary design is illustrated in FIG. 14. In this exemplary design, the same array of sensors 12 (e.g., linear Hall Effect sensors) as those discussed above are utilized. However, the sensors are physically rotated 90 degrees to accommodate magnetic fields produced by a ring magnet attached to a piston head. The FPGA 102 and ADC converters 102 are replaced by a digital signal processor 102A. Preferably the DSP 102A is a Texas Instruments TMS320F240 DSP, which has a 16-channel 10-bit internal analog-to-digital converter as well as integrated flash and RAM memory.

Another difference between this exemplary design and the previous exemplary design is four sensors from the array of twenty sensors are removed, leaving sixteen sensors. By removing the four sensors, the maximum stroke measurable is reduced. However, this design consideration is desirable in order to eliminate any external analog-to-digital converters and increase reliability of the system. A 12-bit serial Digital-to-Analog chip (DAC7611) 140 is provided for facilitating interfacing to applications that seek an analog output signal instead of a digital output signal. Serial digital transmission can be converted from RS232 to RS422 by using the AM26C31MJ 142 chip (instead of the MAX233 on the previous design). In addition, jumpers 144 can be inserted to allow configuration between analog output and digital output.

The circuit has a four wire external connector 146 with two wires assigned to output signal (0-4.095V analog or RS422 differential digital) and two wires assigned to power input. A linear regulator (UC1836J) 142 is provided to the power input so that a wider range of supply voltage can be tolerated by the circuit.

To allow for further expansion and possible temperature compensation, a serial temperature sensor (LM70CIMM-5) 150 and header connectors 152 for the serial peripheral interface (SPI) port-are also included on the board. In order to make the circuit available for a wide range of applications, all of the components included in the circuit are preferably rated for military temperature with the exception of the digital-to-analog chip 140. If high temperature operation is to be performed using analog feedback a higher temperature replacement for the DAC 140 may need to be utilized. If only digital feedback is required then the DAC 140 can be removed from the circuit board.

The DSP 102A has 16 kilobytes of flash memory on-chip for program and calibration data. This data can be reprogrammed in-circuit via a 14 pin standard JTAG header connector 152. The firmware for the DSP 102A operates using a generally simplistic software architecture and cycles in a loop of about 1 kilohertz frame rate. The DSP 102A first reads and sums the output for the array of sensors 12 from the sixteen channel internal analog-to-digital converters using an x-direction center of gravity formula. It takes the result and uses it as an index into an array of calibration corrections to produce an accurate numeric value for the offset from the left into the array of sensors 12 of the center of the characteristic bell-shaped curve imposed on the array of sensors 12 by the field producing element 10.

Once the DSP 102A has the corrected offset value it either sends it out to its internal UART port for transmission over the RS-422 lines or scales the result to 12-bits and shifts the result serially out to the digital-to-analog converter depending on the setting of an output configuration jumper. The DSP 102A then starts the cycle again.

To generate calibration correction tables used by the DSP firmware to obtain even higher accuracy linear position, a calibration set of firmware and a method of reading and transmitting incremental encoder data is provided. During calibration a special firmware version can be loaded into the DSP 102A and an encoder such as a Heidenhain (approx. 5 µm accuracy) can be attached and read concurrently with the calculations for the sensor image data. The data is then bundled together within the DSP and transmitted through the RS-422 port to a computer. The computer generates a correction table containing a set of one-to-one correction values between the positions calculated by the DSP and those read by the higher accuracy incremental device. After generation the table is downloaded into the DSP's flash memory through the JTAG port 152 and used by the normal runtime firmware to produce corrections.

The outputs of the sensors that form the array of sensors 12 is generally extracted and analyzed using an algorithm that enables the user to determine the position of the field producing element 10 and/or its relative position to the shorting armature 64. The present invention makes use of two algorithms, the Center-of-Gravity (CG) algorithm and the Tracking Curve Fit (TCF) algorithm. One of ordinary skill in the art will readily appreciate that one or more algorithms may be utilized to carry out the present invention.

The Center-of-Gravity (CG) algorithm generally computes the x- and y-coordinates of the center of gravity of the sensor image, such as the sensor image shown in FIG. 3. For two-output applications, such as the dual bellows reservoirs example discussed above, the x-coordinate of the center of gravity, CGx, gives the position of the field producing element 10 directly, and the y-coordinate, CGy, is used to infer the separation distance between the field producing element 10 and the shorting armature 64. More specifically, CGy decreases as the separation distance decreases, but the relationship is not linear. Physically, as the shorting armature 64 gets progressively closer to the magnet, the shorting armature 64 redirects progressively more flux. The array or sensors 12 senses progressively less flux, but the center location remains unchanged. Thus, the image shrinks in height only. In contrast, for single-output applications, only CGx is used, since there is no shorting armature 64.

The CG algorithm provides the following benefits over other algorithms: (1) the CG algorithm is computationally simple (e.g., does not require a large amount of processing time); (2) the CG algorithm allows for the position of the field producing element 10 to be interpreted directly; and (3) the CG algorithm incorporates desirable signal averaging properties. The signal averaging property is particularly valuable because it allows the output position to have much higher accuracy than the spacing between sensors. Accuracy is increased using the CG algorithm because more than one sensor participates in the measurement and each sensor provides an output proportional to the measured property of the field generating element (e.g., magnetic flux density).

Computation of the CG location is derived as follows. In general, the CG location in the x-y plane for an arbitrary area A is, $$CGx = \frac{\int_A x \, dA}{\int_A dA}, \quad CGy = \frac{\int_A y \, dA}{\int_A dA} \quad (2,3)$$

Applying equations 2 and 3 to discrete rectangular strips such as those shown in FIG. 3, the element of area due to the $i^{th}$ sensor output is height, $y_i$, times the distance between sensors, D. Here, the x and y variables refer to the centers of each strip. The x-coordinate of the center of the strip is the position of the $i^{th}$ sensor, $x_i$, and y-coordinate of the center of the strip is half the height of the strip. That is, $x=x_i$ in units of inches, and $y=y_i/2$ in units of Gauss. Substituting these variables into Equations (2) and (3) yields discrete versions of the CG equations for n sensors, with units as shown:

$$CGx = \frac{\sum_i x_i y_i}{\sum_i y_i}, \text{[in]} \quad CGy = \frac{\sum_i y_i^2}{2 \sum_i y_i}, \text{[G]} \quad (4,5)$$

Equations (4) and (5) provide the means for real-time signal extraction for the CG algorithm. From a processing standpoint, these equations are desirable because they require little computational horsepower and they can be implemented using integer math.

One minor shortcoming with this algorithm is that as the bell curve begins to move out of the field of interest associated with the array of sensors 12, some distortion results because the center of gravity of the incomplete bell curve is no longer in the same location as the field producing element 10 (e.g., magnet or magnetic component). This effect worsens as more of the bell image goes "out of view". However, since this effect is very repeatable, it can be corrected by post-processing the outputs.

As stated above, one aspect of the present invention is to detect or identify a faulty sensor within the array of sensors 12. In general, there are three types of failure can be detected. The first type deals with failures in the electronic hardware other than the array of sensors 12 (e.g., Hall Effect sensors). This type of failure can be addressed by traditional means (e.g., interrupts, interlocks, wrap-around check, continuity check, heartbeat signal, etc.)

The second type of failure applies to dual-bellows-type applications. In such applications, it is desired to detect a failure in a bellows. In this application, we make use of the natural tendency of the two bellows to move together after one develops a leak. A failure is indicated if the separation between the ends of the two bellows drops below some chosen threshold. A failure can be determined simply from an abnormally low value of CGy (due to a reduction in the bell height), and generally assumes that each of the array of sensors 12 are operating properly.

The third type of failure is that of one or sensors within the array of sensors 12. These errors contribute to overall output error. In addition, accurate detection of sensor failures will allow accurate detection of bellows failures. Indeed, one noteworthy failure mode is a "false-healthy-bellows indication". A false-healthy-bellows indication occurs when the bellows failure is masked by a Hall sensor error.

In developing an approach for detecting sensor failures, the effects of a small error in a single sensor signal, $y_j$, on output accuracy was considered. The sensitivity of CGx can be found by differentiating both sides of Equation (4) with respect to $y_j$, giving, Sensitivity of CGx to error in the jth sensor signal, $$y_j = \frac{\partial CGx}{\partial y_j} = \frac{x_j - CGx}{\sum_i y_i} \quad (6)$$

Similarly, the effect of a single sensor error on CGy is,
Sensitivity of CGy to error in the jth sensor signal, $$y_j = \frac{\partial CGy}{\partial y_j} = \frac{y_j - CGy}{\sum_i y_i} \quad (7)$$

Figure 15A:
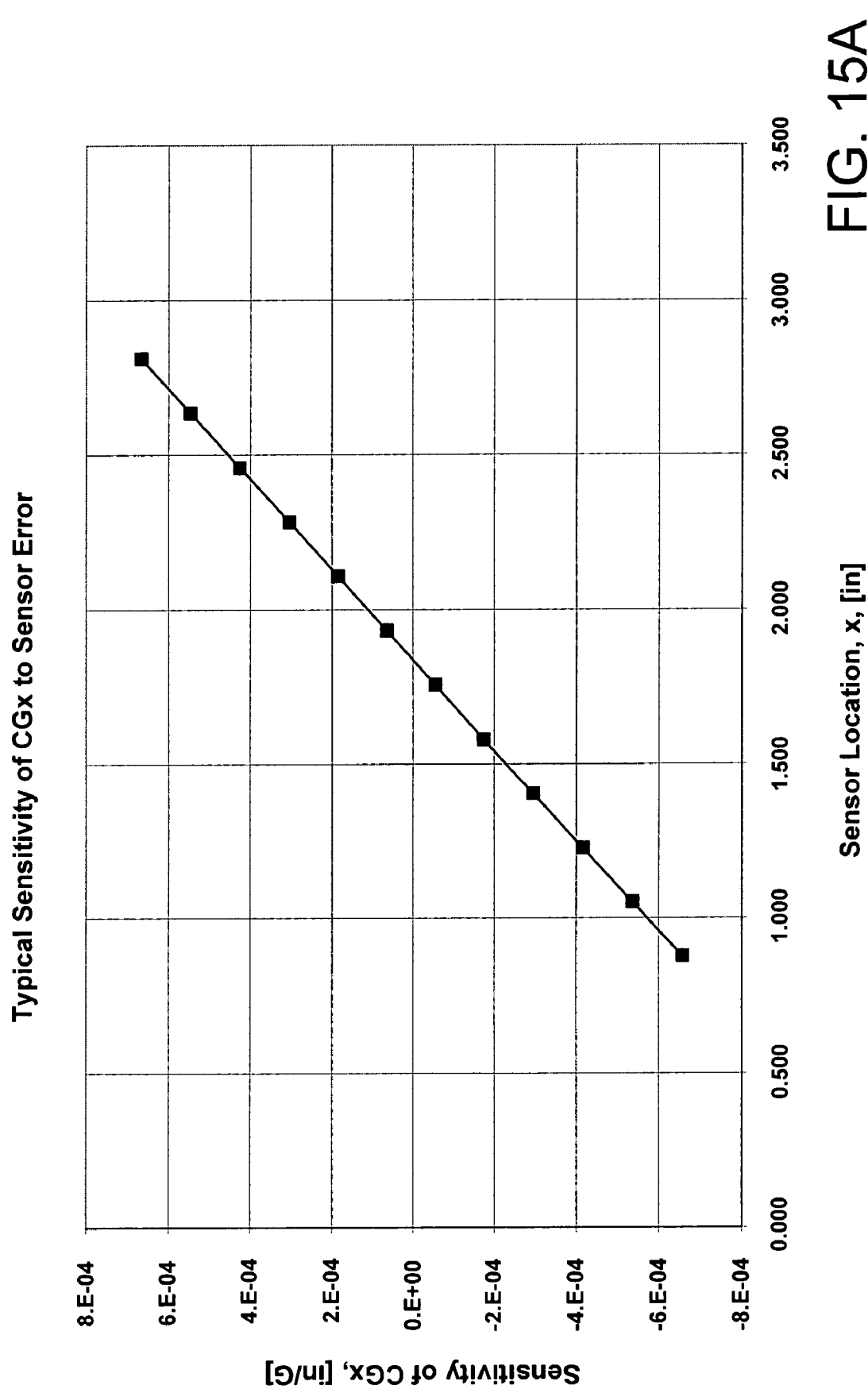
FIGS. 15A-15B graphically illustrate exemplary sensor error sensitivities.
Figure 15B:
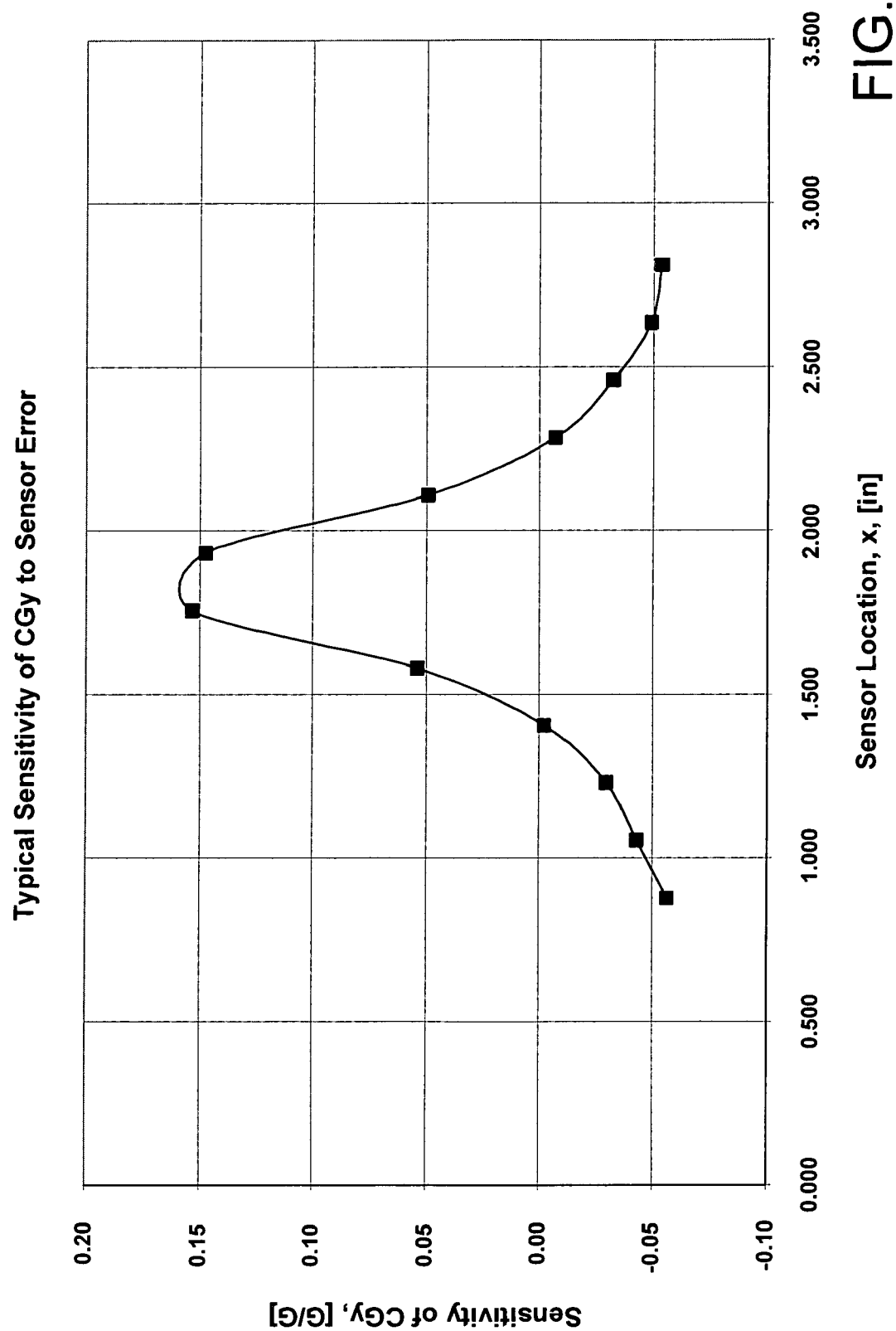

By making a change in one sensor output in a given image, the effects on CGx and CGy can be seen. The sensitivities above are appropriate for small errors, and are useful in predicting overall output accuracy. By studying the effects of errors, it becomes apparent that these sensitivities depend on where the errant sensor is located along the bell curve, as shown in FIGS. 15A and 15B. In summary, individual sensor errors are more pronounced in some locations than in others.

The general approach used for detecting sensor failures is by noting one signal that is either out of the normal range, or inconsistent with the remaining signals. Three specific fault detection/isolation methods for the CG algorithm are described as follows. The first method uses a cubic curve fit to check the consistency of a sensor reading with those of a few nearby sensors. For each interior sensor, a cubic fit of four sensor readings (two on each side) is used to reconstruct (or interpolate) what that sensor should read. For the last two sensors located at each end, an extrapolation is used, based on four interior sensors. This methodology works reasonably well in the slopes and "tails" of the bell curve, but does not work very well near the peak of the curve.

A second error detection method uses signals from three sensors near the sensor of interest to compute a bell curve having statistically normal proportions. That curve is then used to reconstruct what the sensor of interest should read. Despite the fact that the derivation is based on a curve that does not fit the data very closely, it provides reasonably good consistency checks near the peak of the bell. Thus, using these two methods together provides a manner to detect and isolate sensor faults over the entire stroke (or array of sensors).

The next step is to determine how large a sensor error needed to be before it can be regarded as a failure. For example, by inspecting test data, it was determined that signal inconsistencies greater than ±37 G were sufficiently out of the normal range of operation. Error sensitivities were then used to estimate the corresponding worst-case errors in CGx at ±0.025 inch, and in CGy at ±5.6 G. In other words, output errors slightly smaller than these could potentially go undetected, based on this approach for fault detection and isolation.

The third fault detection/isolation method is to simply detect out-of-range signals. Having detected, isolated, and annunciated a failed sensor, the recommended approach to reconfigure for continued operation is simply to substitute the reconstructed signal (as described above) for the failed sensor into the CG calculations. The substitute signal is used because simply omitting the failed sensor signal from the CG calculations would throw off the CG location.

The Tracking-Curve-Fit (TCF) algorithm forms the best fit of a bell curve (in the least-squares sense) to the image provided by the Hall Sensor array. One of ordinary skill in the art will readily appreciated that methods other than least-squares may be utilized in accordance with aspects of the present inventions (e.g., least-absolute-value). As with the CG algorithm discussed above, the function assumed for the bell curve is set forth in Equation (1) above. The TCF algorithm utilizes two degrees of freedom to approximate the fit: 1) the lateral position of the bell, c, (analogous to the magnet position, similar to CGx in the CG algorithm), and 2) the height of the bell, a, (analogous to the magnetic field strength, similar to CGy in the CG algorithm). The computation of the best fit parameters a and c is iterative. The computation is repeated indefinitely, thereby tracking changes in the a and c parameters as the sensor image changes.

The TCF algorithm has distinct advantages over the CG algorithm, for example: (1) the TCF algorithm delivers nearly double the output accuracy in the x-direction, and roughly 20% better accuracy in the y-direction, based on analysis of an exemplary system; (2) the TCF algorithm performs signal extraction and fault detection, for all sensors simultaneously, using one unified computation; (3) once a sensor fault has occurred in a sensor from an array of sensors, it is easier to isolate the faulty sensor because one method applies over the entire stroke; and (4) since the bell curve can be fit to an incomplete image, there is no need to correct for the systematic distortion, as is the case for the CG algorithm. Using the TCF algorithm, once an error has been detected and isolated, there is no need to reconstruct the output of the failed sensor. Instead, the TCF algorithm naturally continues to fit the bell curve to the remaining incomplete image.

The TCF algorithm does have some potential disadvantages as well. These disadvantages includes: (1) requiring an increased number of computations than the CG algorithm, including computations of exponentials; 2) since the TCF algorithm is iterative, the TCF algorithm must be initialized. One practical way to initialize the TCF algorithm is to apply the CG algorithm for the first pass only.

In designs requiring both a field producing element 10 (e.g., a magnet) and shorting armature 64, care should be taken with the flux path attenuation circuit design to insure reasonable symmetry of the bell curve as the shorting armature 64 approaches the magnet.

The objective of the TCF algorithm is to find values for the parameters a and c of the bell curve function, s(x), so as to minimize the sum of the squares of the fitting errors, or "residuals", $r_i$, as measured in the y-direction. For example, a small residual for the $i^{th}$ sensor, can be approximated to first order by a Taylor's series expansion as follows:

$$r_i = y_i - s(x_i) \tag{8}$$

$$= \frac{\partial s}{\partial a}\bigg|_{x_i} \cdot \Delta a + \frac{\partial s}{\partial c}\bigg|_{x_i} \cdot \Delta c$$

$$= f_i \Delta a + g_i \Delta c$$

This equation shows the influences of the estimation errors $\Delta a$ and $\Delta c$ on the $i^{th}$ residual depend on the partial derivatives of $s(x_i)$ defined as $f_i$ and $g_i$.

The TCF algorithm assumes starting values for the parameters a and c. One practical approach to determine initial values is to compute CGx and CGy. The value of CGx can be used directly to initialize c, and a scaled-up CGy can be used to initialize the parameter a. A useful scaling scale factor relating CGy and the parameter a is provided by equation 9.

$$CGy = \frac{\sum_i y_i^2}{2\sum_i y_i} = \frac{a^2 \Sigma f_i^2}{2\Sigma y_i} \approx \frac{0.5a}{2^{1/d}}, [G] \tag{9}$$

The TCF algorithm then computes corrections, $\Delta a$ and $\Delta c$, as follows. If we define, $$\underline{r} = \begin{Bmatrix} y_1 - s(x_1) \\ y_2 - s(x_2) \\ \vdots \\ y_n - s(x_n) \end{Bmatrix}, \quad H = \begin{bmatrix} f_1 & g_1 \\ f_2 & g_2 \\ \vdots & \vdots \\ f_n & g_n \end{bmatrix}, \quad \underline{p} \begin{Bmatrix} \Delta a \\ \Delta c \end{Bmatrix} \tag{10}$$

Then, applying Equation (8) to all sensors in the array leads to n fitting equations, $$\underline{r} = H\underline{p} \tag{11}$$

This overdetermined set of n equations and two unknowns has the least-squares solution, $$\underline{p} = (H^T H)^{-1} H^T \underline{r} = H^{\#} \underline{r} \tag{12}$$

where $H^{\#}$ is the matrix pseudoinverse of the H matrix. If equation 12 is expanded, an equivalent formula for the TCF algorithm is:

Iterative formula used for the TCF Algorithm (13)

$$\begin{Bmatrix} \Delta a \\ \Delta c \end{Bmatrix} = \frac{1}{\Sigma f_i^2 \Sigma g_i^2 - (\Sigma f_i g_i)^2} \begin{bmatrix} \Sigma g_i^2 & -\Sigma f_i g_i \\ -\Sigma f_i g_i & \Sigma f_i^2 \end{bmatrix} \begin{Bmatrix} \Sigma f_i r_i \\ \Sigma g_i r_i \end{Bmatrix}$$

Equation 13 is used to repeatedly (or iteratively) to improve the values of a and c until $\Delta a$ and $\Delta c$ become acceptably small.

Through simulation, it was determined that initial convergence generally requires up to about five iterations. Thereafter only two iterations are typically needed per time step, even when the image is changing at a high slew rate.

At each time step, the evaluation of the derivatives, f(x) and g(x), requires computation of $p(x)=\text{constant}*|x-c|^d$ and $e^{-p(x)}$. In order to reduce the amount of computation required, low-order approximations can be used. For example, such approximations can involve scaling arguments, applying an approximation, and then rescaling the result. For the function p(x), after the argument |x−c| is scaled by repeated doubling until the result falls between 10 and 20, it was determined that a quadratic approximation is adequate over that interval. For the function $e^{-p(x)}$, after the argument −p(x) is scaled by repeated halving until the result falls between ±0.1, it was determined that a linear approximation was adequate over that interval.

The TCF algorithm can be used to detect faulty sensors, isolate the sensor and reconfigure the sensor data to accommodate for the faulty sensor(s). Consideration is given to the effects of a small error in a single sensor signal, $y_j$, on output accuracy. Consider the hypothetical situation of an image of signals that are all perfect, and with the curve fit converged, so that Δa and Δc are both zero. Then by definition, all the residuals $r_i$ are also zero, that is, r=0. This is the nominal situation about which individual sensor error effects will be derived here. Note that the elements of the pseudoinverse matrix $H^\#$ are non-zero.

If a small error is then inserted in the $j^{th}$ sensor, $\Delta y_j$. The residual vector r now has one non-zero element:

$$r = \begin{Bmatrix} \vdots \\ 0 \\ 0 \\ \Delta y_j \\ 0 \\ 0 \\ \vdots \end{Bmatrix} \quad (14)$$

In computing Δa and Δc using Equation 13, the non-zero element of r picks off only the $j^{th}$ column of the $H^\#$ matrix, leaving only, $$\Delta a = h_{1j}^\# \Delta y_j, \text{ and } \Delta c = h_{2j}^\# \Delta y_j \quad (15, 16)$$

where $h_{ij}^\#$ is the element of the H# matrix, specified by the subscripts. Then these values of Δa and Δc approximate the corruptions of a and c that result from the single sensor error. Therefore, the error sensitivities can be read directly from the $H^\#$ matrix:

Sensitivity of parameter a to error in the $j^{th}$ sensor signal, $$y_j = \frac{\partial a}{\partial y_j} = h_{1j}^\# \quad (17)$$

Sensitivity of parameter c to error in the $j^{th}$ sensor signal, $$y_j = \frac{\partial c}{\partial y_j} = h_{2j}^\# \quad (18)$$

The $H^\#$ matrix thus contains a complete real-time list of sensitivities for all of the sensors. By comparing the elements across one row of $H^\#$, it is evident that the system output is more sensitive to errors in some sensors than others. The greatest sensitivities tend to be found near the peak of the bell curve. Also, since this is essentially a linear system of errors, multiple sensor errors simply superpose (as per Equation 13).

By examining residuals of typical, healthy sensors over the entire stroke in the CG algorithm discussed above, a maximum residual of about 24 Gauss was identified in the exemplary system. By choosing a failure threshold of 30 Gauss, it was predicted that a worst-case undetectable sensor failure would produce output errors no greater than ±0.014 in. In order for the worst-case error to actually be seen, the failure would have to occur right at the peak of the bell curve. The output error would be less if the failed sensor is away from the peak of the bell curve.

Hall sensor failures can be detected and isolated as described above: using a pre-set failure threshold for TCF residuals. The same threshold value can apply across the entire stroke of the sensor array. It is important to point out that the residuals are already available as part of the TCF algorithm. Thus, the TCF algorithm provides signal extraction, fault detection, and isolation in a single computational procedure.

The TCF algorithm does not require that the array sensors be evenly spaced. As set forth in equation 13, the TCF algorithm simply finds the best fit to the existing image, regardless of sensor placement and position of the bell curve. Therefore, when a failed sensor has been identified, its signal is simply skipped over in applying Equation 13.

In summary, two algorithms have been described for signal extraction and fault management. Each algorithm has advantages and shortcomings. Generally, compared with the CG algorithm, the TCF algorithm has better accuracy and offers a more cohesive procedure for detecting and isolating Hall sensor failures. However, it is more computationally intensive. For applications in which computational horsepower and/or sampling rate are limited, the CG algorithm is preferable. These considerations impact the system design configuration and implementation, primarily in terms of the choice of signal processing hardware and physical location of the electronics.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A through wall position sensor system comprising:
at least one field producing element separated by a wall from an array of sensors, wherein the array of sensors detects a property associated with the at least one field producing element and outputs a corresponding output signal indicative of the property associated with the at least one field producing element; and a processor communicatively coupled to the array of sensors for processing the output signal from one or more sensors, wherein the processor utilizes a tracking curve fit algorithm to analyze the output signal from the one or more sensors by fitting the output signals to a bell-shaped characteristic curve, wherein the tracking curve fit algorithm utilizes an iterative calculation that takes into account one or more prior sensor output signals to determine at least one of a lateral position of and/or a height of the bell-shaped characteristic curve and a best fit of the output signals to the bell-shaped characteristic curve to determine a position associated with the field producing element.

2. The system of claim 1, wherein the field producing element is a magnet.

3. The system of claim 1, wherein the one or more sensors output analog voltages substantially proportional to a magnetic flux density associated with the magnetic field producing element at each sensor location.

4. The system of claim 1, wherein the array of sensors are secured to a circuit board, wherein the circuit board is configurable to communicate with a second array of sensors, thereby extending an effective range for detecting the property associated with the at least one field producing element.

5. The system of claim 1, wherein the at least one property associated with the magnet field producing element is a magnetic flux density.

6. The system of claim 1, wherein the processor is a field programmable gate array.

7. The system of claim 1, wherein the best fit is determined by determining an error measurement associated with a difference between the output signal from each sensor of the array of sensors and the characteristic bell-shaped curve.

8. The system of claim 7, wherein the error measurement is determined by calculating a least square error measurement between the output signal from each sensor of the array of sensors and the characteristic bell-shaped curve.

9. The system of claim 7, wherein the error measurement is associated with a lateral position of the characteristic bell-shaped curve and/or a height of the characteristic bell-shaped curve.

10. The system of claim 1, wherein a center of gravity algorithm is used to provide an initial measurement to determine the position associated with the field producing element and subsequent measurements are made iteratively with the tracking curve fit algorithm.

11. The system of claim 1, wherein the lateral position of the bell-shaped characteristic curve corresponds to the position of the field producing element.

12. The system of claim 1, wherein the height of the bell-shaped characteristic curve corresponds to a field strength detected from the field producing element.

13. The system of claim 1, wherein the bell-shaped characteristic curve is characterized by an exponential function.

14. The system of claim 1, wherein the bell-shaped characteristic curve is characterized by an exponential function.

15. The system of claim 13, wherein the exponential function is characterized by $$s(x) = ae^{-b|(x-c)/D|^d}, [G],$$

wherein x=sensor position, a=flux at the peak of the bell-curve, b=width factor, c=location of center of the bell-curve, d=shape factor, and D=distance between sensors.

16. The system of claim 1, wherein sensor output deviation from the bell-shaped characteristic curve is compared to a threshold value to determine if one of the array of sensors is defective.

17. A method for determining a position of a member comprising:
providing a field producing element;
detecting at least one property associated with the field producing element by a plurality of sensors, wherein the plurality of sensors output a signal indicative of the at least one property detected;
processing the signals related to the at least one detected property of the field producing element for the plurality of sensors with a tracking curve fit algorithm to analyze the output signal from the plurality of sensors to determine a position associated with the field producing element by fitting the output signal from the plurality of sensors to a bell-shaped characteristic curve, wherein the tracking curve fit algorithm utilizes an iterative calculation that takes into account one or more prior output signals to determine at least one of a lateral position of and/or a height of the bell-shaped characteristic curve and a best fit of the output signals to the bell-shaped characteristic curve; and
analyzing the signals using a bell-shaped characteristic curve to determine a position associated with the magnetic field producing element.

18. The method of claim 17, wherein the step of processing information includes determining a position associated with the field producing element.

19. A method for determining a position of a field producing element comprising:
providing a field producing element;
detecting a property of the field producing element by a plurality of sensors, wherein at least a portion of the sensors output a signal indicative of the property detected;
processing the signals output from at least a portion of the sensors; and
analyzing the signals output from at least a portion of the sensors using a bell-shaped characteristic curve with a tracking curve fit algorithm to analyze output signals from at least portion of the sensors to determine a position associated with the field producing element by fitting output signals from the at least a portion of the sensors to a bell-shaped characteristic curve, wherein the tracking curve fit algorithm utilizes an iterative calculation that takes into account one or more prior output signals to determine at least one of a lateral position of and/or a height of the bell-shaped characteristic curve and a best fit of the output signals to the bell-shaped characteristic curve; and
determining a defect in at least one of the plurality of sensors based on the step of analyzing the signals output from at least a portion of the sensors using a bell-shaped characteristic curve.

20. The method of claim 19, wherein the step of determining a defect includes comparing the output deviation from the characteristic bell-shaped curve of the plurality of sensors with a threshold value.

21. The method of claim 20 further including determining a position associated with the field producing element by excluding at least one sensor having an output deviation above the threshold value.

* * * * *